United States Patent [19]

Nishioka et al.

[11] Patent Number: 4,622,867
[45] Date of Patent: Nov. 18, 1986

[54] METHOD OF CONTROLLING RATIO CHANGE IN CONTINUOUSLY VARIABLE TRANSMISSION

[75] Inventors: Tetsuji Nishioka, Fujisawa; Katsunori Oshiage, Yokosuka, both of Japan

[73] Assignee: Nissan Motor Co., Ltd., Yokohama, Japan

[21] Appl. No.: 587,902

[22] Filed: Mar. 9, 1984

[30] Foreign Application Priority Data

Mar. 14, 1983 [JP] Japan .................................. 58-40807

[51] Int. Cl.$^4$ ............................................. B60K 41/12
[52] U.S. Cl. ........................................ 74/866; 74/862
[58] Field of Search ................ 74/866, 865, 862, 861, 74/877; 364/424.1

[56] References Cited

U.S. PATENT DOCUMENTS

| 4,291,594 | 9/1981 | Baudoin | 74/866 X |
| 4,353,272 | 10/1982 | Schneider et al. | 74/866 X |
| 4,387,608 | 6/1983 | Mohl et al. | 74/866 |
| 4,428,257 | 1/1984 | Meyerle et al. | 74/866 |
| 4,458,560 | 7/1984 | Frank et al. | 74/866 X |
| 4,466,521 | 8/1984 | Hattori et al. | 74/866 X |
| 4,470,117 | 9/1984 | Miki et al. | 364/424.1 |
| 4,515,040 | 5/1985 | Takeuchi et al. | 74/864 X |

FOREIGN PATENT DOCUMENTS

| 57-90450 | 6/1982 | Japan . | |
| 1525861 | 9/1978 | United Kingdom | 74/866 |

Primary Examiner—Kenneth J. Dorner
Assistant Examiner—Joseph M. Rolnicki
Attorney, Agent, or Firm—Schwartz, Jeffery, Schwaab, Mack, Blumenthal & Evans

[57] ABSTRACT

According to the method, a new ratio change allowable range is obtained by learning and stored in a RAM and a ratio change is carried out within this ratio change allowable range.

4 Claims, 9 Drawing Figures

METHOD OF CONTROLLING RATIO CHANGE IN CONTINUOUSLY VARIABLE TRANSMISSION

REFERENCE TO RELATED APPLICATION

Reference is made to a co-pending U.S. patent application Ser. No. 411,987 filed Aug. 26, 1982 (now U.S. Pat. No. 4,515,040) "Control Apparatus and Method for Engine-Continuously Variable Transmission".

BACKGROUND OF THE INVENTION

The present invention relates to a method of controlling a ratio change in a continuously variable transmission.

A conventional method of a ratio change in continuously variable transmission, is disclosed in Laid-open Japanese Patent Application No. 57-90450. According to this conventional method, a control unit stores an ideal control line which interconnects points disposed on the performance curves of an engine, each point representing an operating condition under which the engine can operate with the least fuel consumption rate. Comparison is made between the operating condition represented by a corresponding one of the points on the ideal control line and an actual operating condition (an engine revolution speed, a throttle opening degree, a vehicle speed and etc.) of a vehicle. In response to the result of this comparison, the ratio change is controlled in such a manner as to bring the actual operating condition of the engine into agreement with the stored operating condition on the ideal control line. The ratio change is carried out within a ratio change allowable range which is fixed and determined according to the design of the pulley drive unit of the transmission. Taking into account the manufacturing variation of the pulley drive unit and the change according to aging, the ratio change allowable range which is actually used in carrying out the ratio change is set narrower than a ratio change allowable range, which is actually usable. Viz., in order to prohibit the issuance of the instructions to establish a ratio outside of the range actually attainable by the pulleys, the relatively narrow ratio change allowable range is necessarily set. Thus, the conventional continuously variable transmission has to operate on the relatively narrow ratio change allowable range. As a result, a problem arises that a sufficiently large acceleration is not produced when the vehicle moves off from standstill because a reduction ratio large enough for the sufficient acceleration is not allowed to use, and a sufficient improvement in the fuel consumption rate is not made during stable operating state at high speeds because a sufficiently small reduction ratio is not allowed.

SUMMARY OF THE INVENTION

According to the present invention, an actually usable ratio change allowable range which is wider than an initially set ratio change allowable range is obtained by learning and stored in a RAM, and a ratio change is carried out within the new ratio change allowable range.

An object of the present invention is to provide a method of controlling a ratio change in a continuously variable transmission wherein the range of a ratio change allowable range is extended as wide as possible.

DESCRIPTION OF THE EMBODIMENTS

Hereinafter, the present invention is described along with FIGS. 1 though 7 of the accompanying drawings illustrating a first embodiment according to the present invention.

First of all, the construction is described.

Figure 1:
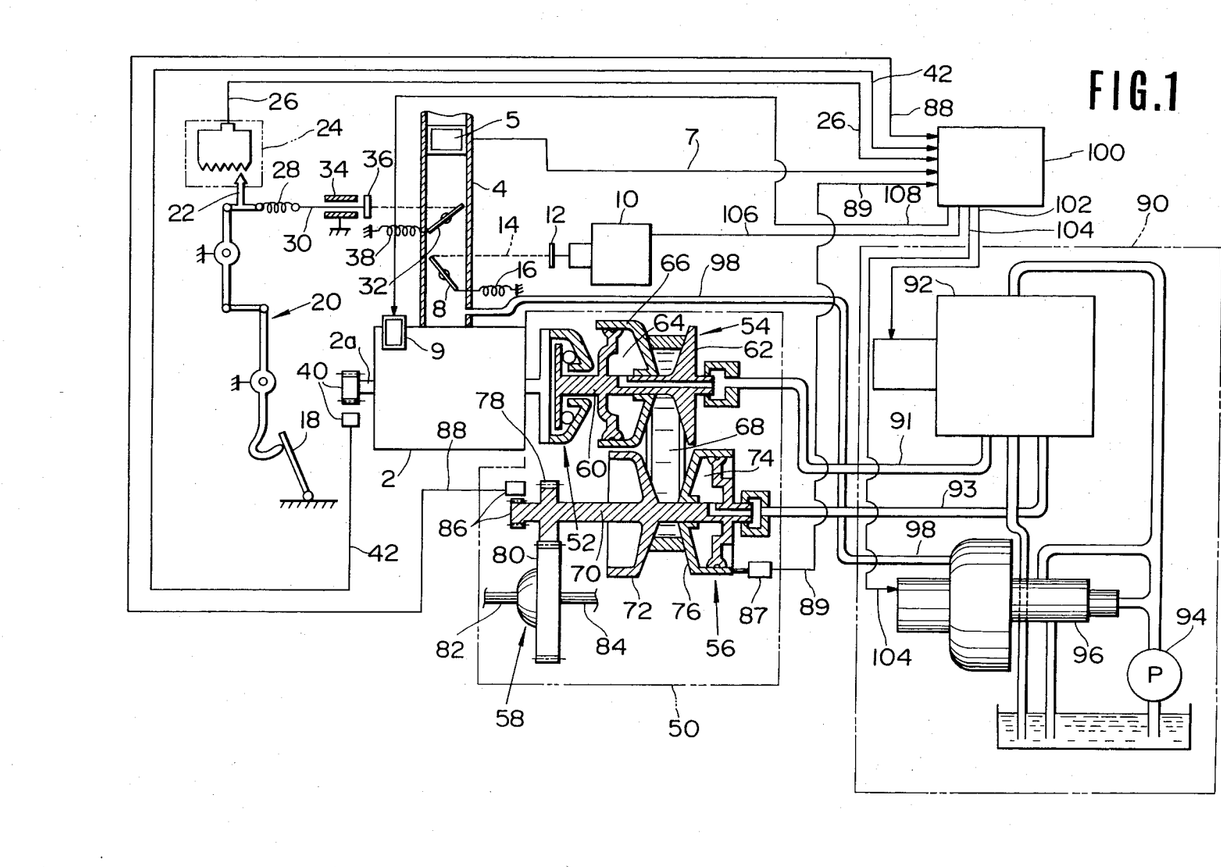
FIG. 1 is a general diagram illustrating a control unit, an engine and a continuously variable transmission.

FIG. 1 diagrammatically shows an engine, a continuously variable transmission, a control unit and etc., which cooperate to carry out a method of controlling a ratio change in a continuously variable transmission according to the present invention.

Within an inlet manifold 4 of an engine 2, there is provided an air flow meter 5 which provides its detection signal 7 to an electronic control unit 100. Fuel to the engine is supplied by a fuel injection valve 9. The injection by the fuel injection valve 9 is controlled by an electric signal 108 supplied by the electronic control unit 100. The throttle valve 8 opens in degrees and is actuated by a throttle valve actuator 10 in response to an electric signal 106 fom the electronic control unit 100. Viz., the throttle valve 8 is pulled via a wire 14 equipped with a stop 12 by the throttle valve actuator 10 and thus is rotated against a return spring 16. The stroke of the accelerator pedal 18 is transmitted to the lever 22 via a link mechanism 20. The lever 22 has connected thereto a movable portion of an accelerator pedal sensor 24 that serves as a converter which converts a displacement to an electric signal, thus providing an electric signal 26 indicative of the stroke of the accelerator pedal 18. The electric signal 26 from the accelerator pedal sensor 24 is sent to the electronic control unit 100. The lever 22 is connected with a safety throttle valve 32 via a spring 28 and a wire 30, the wire 30 passing through a stationary portion 34 and equipped with a stop 36. The stop 36 is so arranged that it comes into contact with the stationary portion 34 when the accelerator pedal 18 is depressed by about 10% and in this state (i.e., the state when the stop 36 comes into contact with the stationary portion 34), the safety throttle valve 32 is opened by 100%. Therefore during the subsequent stroke (from 10% to 100%) of the accelerator pedal 18 the safety throttle valve 32 remains in the fully opened position because the spring 28 extends to allow the stroke. The safety throttle valve 32 is subjected to a force by a return spring 38, which force biases the valve 32 in the closing direction thereof. An engine revolution speed sensor 40 is provided on a revolution shaft 2a of the engine 2, which sensor provides an electric signal 42 to the electronic control unit 100. Rotational force of the engine 2 is delivered to a continuously variable V-belt transmission 50. The continuously variable transmission 50 includes a centrifugal clutch 52, a drive pulley 54, a driven pulley 56 and a final drive 58. The centrifugal clutch 52 starts transmitting the rotational force of the engine 2 to the drive pulley 54 via a drive shaft 60 when the revolution speed of the centrifugal clutch, i.e., the engine speed, exceeds a predetermined value. The drive pulley 54 includes a fixed conical disc 62 fixed to the drive shaft 60 and a movable conical disc 66 which is arranged to face the fixed conical disc 62 to define a V-shaped pulley groove therebetween and which is movable axially along the drive shaft 60 in response to an oil pressure acting within the drive pulley cylinder chamber 64. The drive pulley 54 is drivingly connected to a driven pulley 56 via a V-belt 68, the driven pulley 56 including a fixed conical disc 72 fixed to a driven shaft 70 and a movable conical disc 76 which is arranged to face the fixed conical disc 72 to define a V-shaped pulley groove and which is movable axially along the driven shaft 70 in response to an oil pressure acting within a driven pulley cylinder chamber 74. During transmission of power from the drive pulley 54 to the driven pulley 56, the ratio of revolution of the drive pulley 54 to that of the driven pulley 56 can be varied by axially displacing the movable conical disc 66 of the drive pulley 54 and the movable conical disc 76 of the driven pulley 56 to vary the radius of the effective diameter of each of the pulleys contacting the V-belt 68. For example, if concurrently with increasing the width of the V-shaped pulley of the drive pulley 54, the width of the V-shaped pulley groove of the driven pulley 56 is decreased, the radius of the effective diameter at which the drive pulley 54 contacts with the V-belt decreases and the radius of the effective diameter at which the driven pulley 56 contacts with the V-belt increases, thus providing a large reduction ratio. If the movable conical discs 66 and 76 are displaced in the opposite directions to the above case, the reduction ratio becomes small.

There is provided on the driven pulley 56 a pulley position sensor 87 (for example, a potentiometer), which sensor 87 provides a signal 89 to the electronic control unit 100. The driven shaft 70 is connected with output shafts 82 and 84 via reduction gears 78 and 80 of the final drive 58. The driven shaft 70 is equipped with a vehicle speed sensor 86 that detects the revolution speed (which corresponds to vehicle speed) of the driven shaft 70. An electric signal 88 from the vehicle speed sensor 86 is sent to the electronic control unit 100. The before mentioned drive pulley cylinder chamber 64 and driven pulley cylinder chamber 74 are connected with a ratio change control valve 92 of an oil pressure control system 90 via conduits 91 and 93. The control valve 92 is controlled in response to an electric signal 102 from the electronic control unit 100. The line pressure supplied to the control valve 92 from an oil pump 94 is regulated by a line pressure regulator valve 96. The line pressure regulator valve 96 is controlled in response to an electric signal 104 from the electronic control unit 100. The line pressure regulator valve 96 is supplied with a vacuum from the inlet manifold 4 via a pipe 98. As previously described, the electronic control unit 100 is fed with electric signals 7, 26, 42, 88 and 89 from the air flow sensor 5, accelerator pedal sensor 24, engine revolution speed sensor 40, vehicle speed sensor 86 and pulley position sensor 87, and based on these electric signals the electronic control unit 100 outputs electric signals 106, 102, 104 and 108 to the throttle valve actuator 10, ratio change control valve 92, line pressure regulator valve 96 and fuel injection valve 9.

Next, the electronic control unit 100 which is constructed of a microcomputer is described in terms of how it works. The microcomputer includes as usual a CPU, an I/O interface, a ROM and a RAM.

Figure 2:
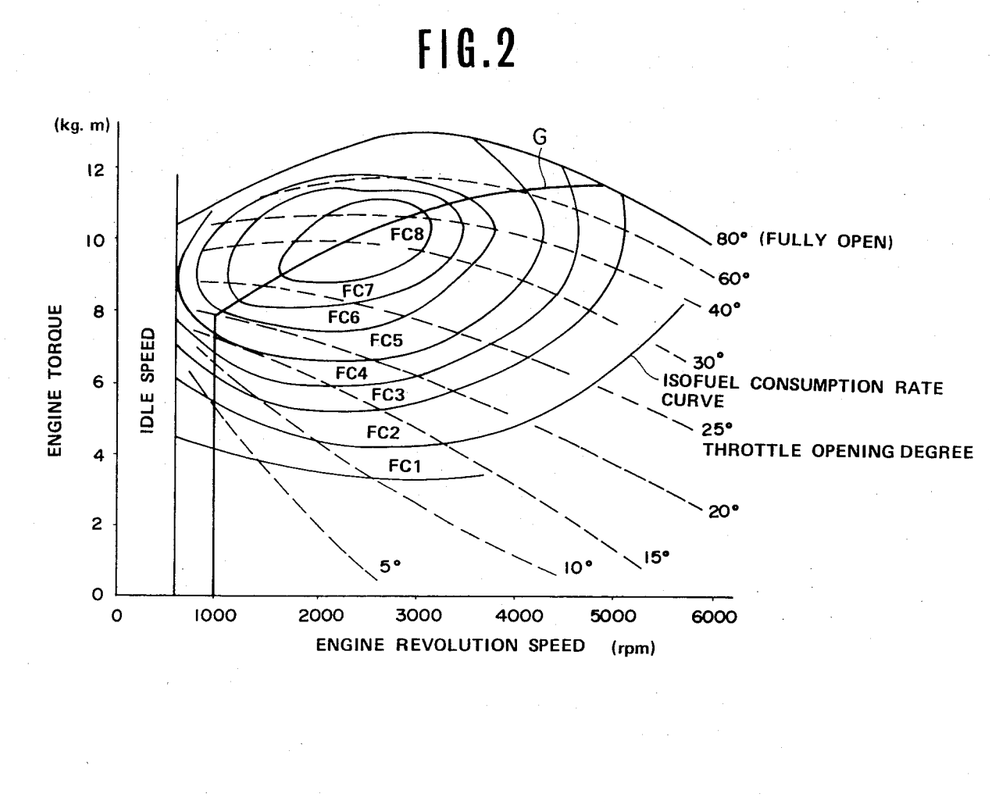
FIG. 2 illustrates engine performance curves.
Figure 3:
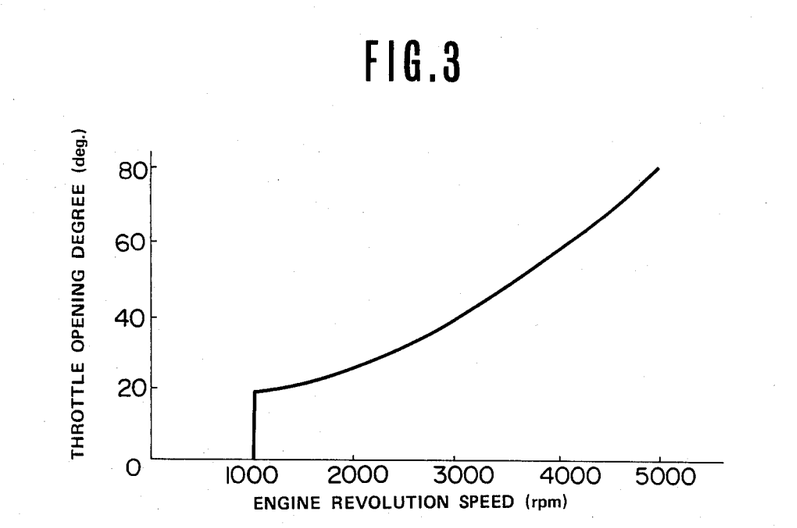
FIG. 3 is a graph showing an ideal control line.
Figure 4:
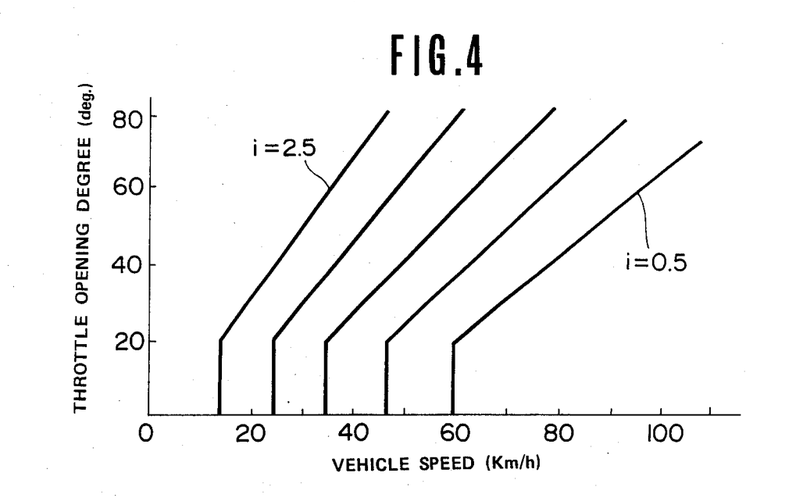
FIG. 4 is a reduction ratio diagram.
Figure 5:
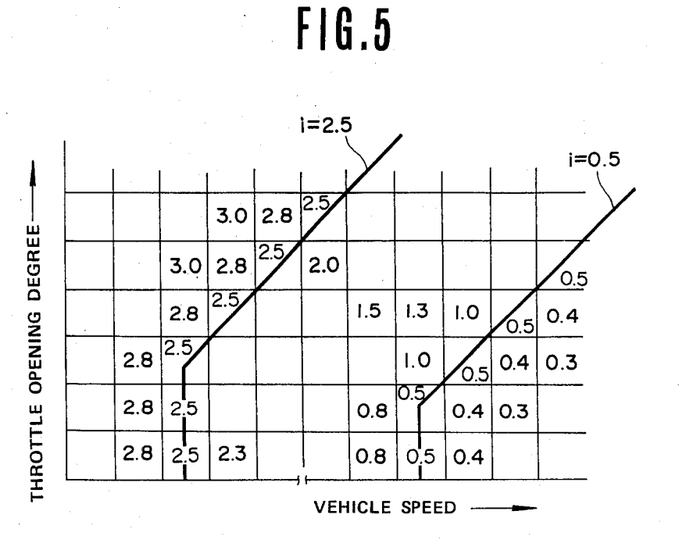
FIG. 5 is a view showing a reduction ratio Table.

First of all, a reduction ratio Table which provides desired reduction ratio values is described. Referring to FIG. 2, there are shown performance curves of the engine. An ideal control line G is a line which interconnects points, each where the engine operates with the minimum fuel consumption rate. If the operating state along this ideal control line G is expressed in terms of a throttle opening degree and an engine revolution speed, a relationship as shown in FIG. 3 is obtained. If the relationship shown in FIG. 3 is expressed in terms of vehicle speed replacing engine revolution speed, a relationship as shown in FIG. 4 is provided for each of various reduction ratios. In FIG. 4, the initially set maximum and minimum values which define a ratio change allowable range are set 2.5 and 0.5, respectively. Here, reduction ratio=(revolution speed of the drive pulley)/(revolution speed of the driven pulley). The reduction ratio graph as shown in FIG. 4 can be expressed in terms of actual values as arranged in a Table shown in FIG. 5. In the case of the reduction ratio Table shown in FIG. 5, there are arranged values in a region greater than the initially set maximum value 2.5 and in a region less than the initially set minimum value 0.5 because the reduction ratios disposed within these regions are available for use.

Figure 6:
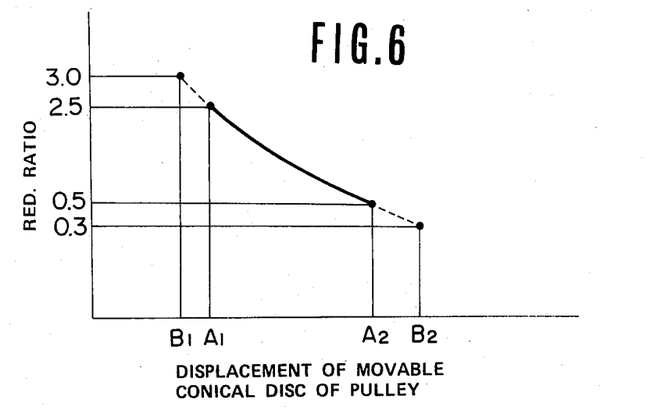
FIG. 6 is a graph showing the displacement of a movable conical disc versus the reduction ratio.

The relationship between the displacement of a movable conical disc of a pulley with a reduction ratio is shown in FIG. 6.

As described before, the initially set ratio change allowable range is from 0.5 to 2.5 (i.e., a range between A1 and A2 in terms of the displacement of a movable pulley disc) and this range is obtained as a result of multiplication of a safety factor taking into account the manufacturing variation from one pulley to another and the change due to aging versus time. However, a range from 0.3 to 3.0 (i.e., a range between B1 and B2 in terms of the displacement of a movable pulley conical disc) may be used as a ratio change allowable range. In order for the continuously variable transmission to carry out a ratio change within a new ratio change allowable range which is wider than the initially set ratio change allowable range from 0.5 to 2.5 but which does not exceed the range from 0.3 to 3.0, the new ratio change allowable range is determined by learning.

Figure 7:
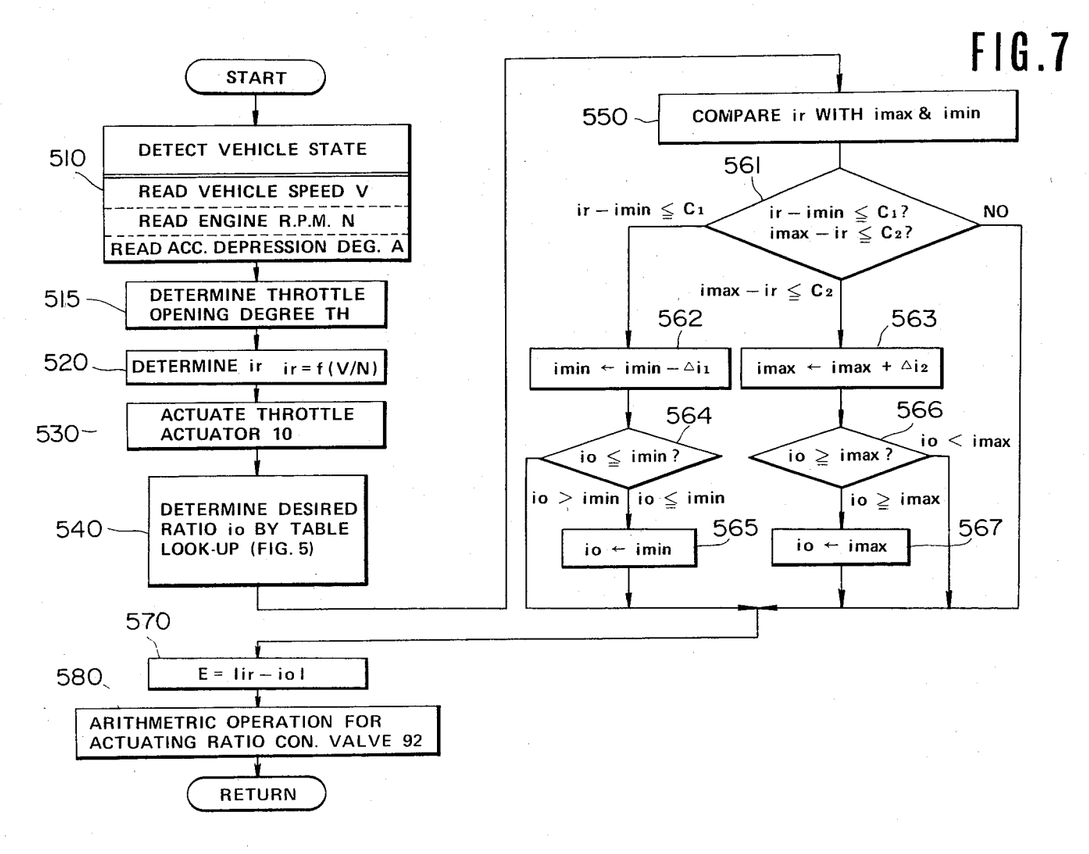
FIG. 7 is a flowchart showing how to learn a ratio change allowable range.

Referring to the flowchart shown in FIG. 7, the procedure to learn the new ratio change allowable range is described. First, the vehicle speed V, engine revolution speed N and accelerator depression degree A are read from the vehicle speed sensor 86, engine revolution speed sensor 40 and accelerator pedal sensor 24, respectively, so as to detect the operating state of the vehicle (in a step 510). Subsequently, an actual reduction ratio ir is obtained from computation based on the vehicle speed V and the engine revolution speed N (in a step 520). Next, from the accelerator depression degree A which indicates the torque demand by a driver, the vehicle speed V and the engine revolution speed N, a throttle opening degree TH is obtained by computation of a predetermined equation (in a step 515), and an instruction signal 106 is supplied to the throttle valve actuator 10 (in a step 530). With the actuator 10, the opening degree of the throttle valve 8 is adjusted toward the throttle opening degree TH. Using the throttle opening degree TH and the vehicle speed V, a desired reduction ratio io is determined by a table lookup of the reduction ratio table shown in FIG. 5 (in a step 540). A comparison is made between the actual reduction ratio ir and the maximum value imax and the minimum value imin which are described later (in a step 550). As the maximum value imax and the minimum value imin, the values which have been obtained by computation in the preceding routine and stored in the RAM (Random Access Memory) are used. In case the values are not stored in the RAM (i.e., when the stored values have disappeared as a result of disconnecting the microcomputer from the battery although in the usual case the stored values are kept even after the ignition switch is turned off), the maximum and minimum values of the initially set ratio change allowable range, i.e., initially set values which are stored in the ROM (Read Only Memory) are used. The initially set values are 2.5 and 0.5, respectively in this embodiment. Then, a determination is made of the result of comparison of the above mentioned actual reduction ratio ir with the maximum value imax and the minimum value imin (in a step 561). If a difference imax−ir is less than or equal to a predetermined small value $C_2$ (i.e., if the actual reduction ratio ir is very close to the maximum value imax), the program proceeds to a step 563. If a difference ir−imin is less than or equal to a predetermined small value $C_1$ (i.e., if the actual reduction ratio ir is very close to the minimum value imin), the program proceeds to a step 562. In the other cases, the program proceeds to a step 570 (in this case no correction is made on imax and imin). In the step 563, a small value $\Delta i2$ is added to the current imax and the result is set as a new imax. The current value of imax stored in the RAM is replaced with this new value. Then, this new imax is compared with the desired reduction ratio io (in a step 566). If io is less than imax, the program proceeds to a step 570, while if io is greater than or equal to imax, the current value of io is replaced with the value of imax. Viz., the steps 566 and 567 are executed so as to prevent the desired reduction ratio io from becoming greater than imax. In the step 562, a small value $\Delta i1$ is subtracted from the current value of imin and the result is set as a new value of imin. The value of imin stored in the RAM is replaced with this new value. Then, the desired reduction ratio io is compared with the new imin (in a step 564). If the desired reduction ratio io is greater than imin, the program proceeds to a step 570, while, if the desired reduction ratio io is less than or equal to imin, imin is set as a new value of io, and the program proceeds to a step 570. That is, the step 563 is executed to correct the maximum value imax so as to increase the value thereof, while the step 562 is executed to correct the minimum value imin to decrease the value thereof. It follows that they are corrected so as to provide a new ratio change allowable range which is wider than the initially set range. In the step 570, a deviation E between the actual reduction ratio ir and the desired reduction ratio io is determined, and then in a step 580, a suitable arithmetic operation is executed which is necessary for actuating the shift control valve 92 in such a direction as to reduce the above mentioned deviation E. After the execution of this step, the program completes one routine. The execution of the above mentioned arithmetic operation along the steps is repeated. Therefore, the maximum value imax will take the largest value within a possible range while the vehicle is operating with a reduction ratio near the maximum value imax, while the minimum value imin will take the smallest value within a possible range while the vehicle is operating with a reduction ratio near the minimum value imin. It follows that the vehicle can operate using the widest available ratio change allowable range.

Because the vehicle speed V is not available as an input upon starting the engine where the vehicle stays at standstill, the actual reduction ratio cannot be determined in the step 520. In this case, the signal 89 from the pulley position sensor 8 is read and used as the actual reduction ratio signal in the subsequent procedure, and a start-up reference reduction ratio stored in the ROM, which corresponds to the initially set maximum reduction ratio value, is read in the step 540 upon starting the engine only. As a result, a signal corresponding to the actual reduction ratio is obtained even when the vehicle is at standstill, thus allowing the continuously variable transmission to establish the maximum reduction ratio each time the vehicle starts moving off from a standstill.

In the above mentioned embodiment, the learning is carried out over all of the operating states of the vehicle, it is acceptable to carry out the learning during predetermined operating states because it is in these predetermined operating states that the reduction ratio becomes the maximum or the minimum. Viz., the learning of the maximum value imax should be carried out when the throttle opening degree is greater than a predetermined value and the vehicle speed is less than a predetermined value because, in this operating state, the vehicle operates with a reduction ratio near the maximum reduction ratio. The learning of the minimum value imin should be carried out when the throttle opening degree falls in a predetermined range and the vehicle speed is greater than a predetermined value because, in this operating state, the vehicle operates with a reduction ratio near the minimum value. (In this case, the learning is not required, the program jumps from the step 540 to the step 570.)

Although, in this embodiment, the current minimum value of imin and the maximum value of imax are replaced with new values, respectively, in steps 562 and 563, it is possible to have the current value imin (or imax) with the result of the sum of a value imin (or a value imax) obtained in the preceding routine and a value imin (or a value imax) obtained in one before the preceding routine after giving weights to them, respectively.

Figure 8A:
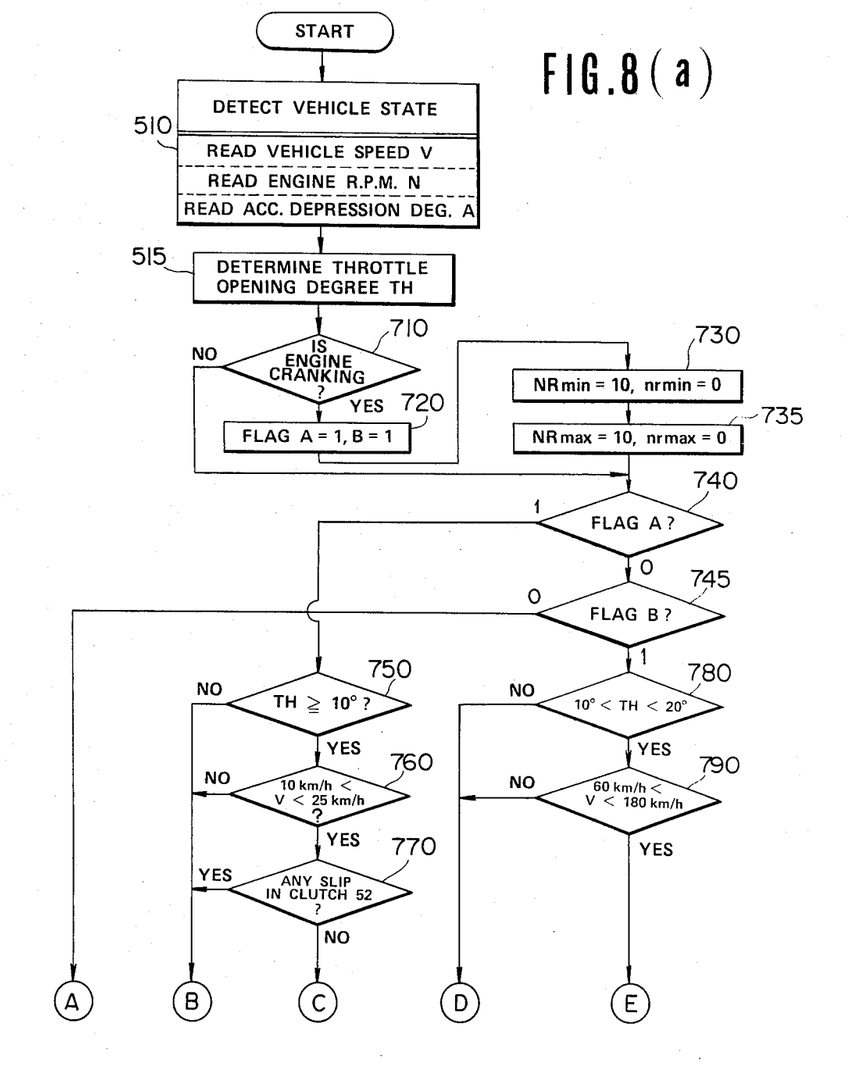
FIGS. 8(a) and 8(b) illustrate a flowchart showing another way of learning a ratio change allowable range.
Figure 8B:
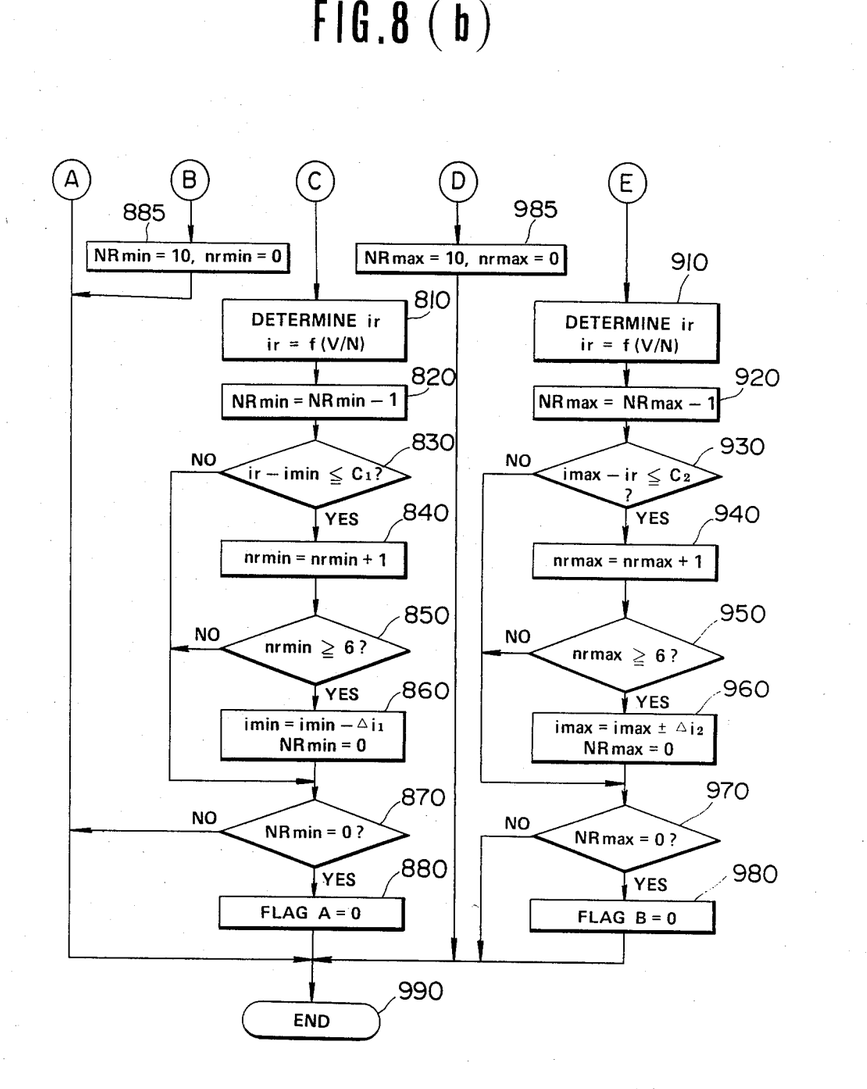

Hereinafter, the second embodiment is described along with FIGS. 8(a) and 8(b).

As there is little possibility that the maximum value imax and the minimum value imin vary during a short period of time for a period of driving, the learning may be suspended after the learning is carried out after the engine start-up and is resumed after restarting the engine. The second embodiment incorporating this idea is described along with FIGS. 8(a) and 8(b).

In this embodiment, the learning is carried out once in a predetermined operating state where the reduction ratio is near the maximum value or the minimum value. By the expression that the learning is carried out once we mean that the actual reduction ratio is determined n times (for example, 10 times) and a determination is made once based on this result.

First of all, a determination is made whether or not the engine is cranking in step 710 by detecting the closing of a starter motor circuit. If the engine is cranking, the program proceeds to a step 720 where flags A and B in the RAM, which indicate whether or not the learning of the minimum value of the reduction ratio and whether or not the learning of the maximum value of the reduction ratio, respectively, have been carried out, are given values 1 (one), respectively. Then, in a step 730, NRmin and nrmin in the RAM are given 10 and 0 (zero), respectively. The reason why NRmin is given 10 is to carry out the step of determining the actual reduction ratio ir 10 (ten) times in learning to determine minimum value imin. nrmin designates how many times the value which may be recognized as the minimum value of the reduction ratio has appeared as a result of preceding routines carried out, and as described later it is used to determine whether or not the result of the learning is employed at last. NRmax and nrmax in a step 735 are employed in the similar manner to NRmin and nrmin in learning the maximum value imax. In steps 740 and 745, the fact that the value of the flag A or B is 1 indicates that the learning is not yet carried out, while the fact that the value of the flag A or B is 0 (zero) indicates that the learning has been carried out. After judging the values of the flags A and B, if the learning of the minimum value of the reduction ratio has not been carried out, the program proceeds to a step 750, while if the learning of the maximum value has not been carried out, the program proceeds to a step 780. Steps 750, 760 and 770 are provided to determine whether or not a predetermined operating state has been established for the learning. The learning starts when three conditions, i.e., the throttle opening degree TH is greater than or equal to 10°, the vehicle speed V is between 10 km/h and 20 km/h, are met and there is no slip in the centrifugal clutch 52. In the step 770, it is determined that there is slip in the centrifugal clutch 52 when the engine speed N is lower than the predetermined value. Steps 780 and 790 are provided to determine whether or not a predetermined state (10°<TH<20° and 60 km/h<V<180 km/h) is accomplished before the learning starts. In a step 810, an actual reduction ratio ir is determined similarly to the step 520 in FIG. 7, and each time after the completion of this step 810, NRmin is decreased by 1 (one) in a step 820. In a step 830, a determination is made whether or not a difference between the actual reduction ratio ir and the minimum value imin is less than or equal to C1. If the difference is greater than C1, the program proceeds to a step 870. If the difference is less than or equal to C1, the program proceeds to a step 840 where nrmin is increased by 1 (one). If nrmin is greater than or equal to 6 in a step 850, the program proceeds to a step 860, imin is decreased by $\Delta i1$. In the step 860, NRmin is given 0 (zero) before the program proceeds to a step 870 because the value of imin has been renewed 6 (six) times. In the step 870, a determination is made whether or not the determination of the actual reduction ratio ir has been carried out 10 (ten) times. If NRmin is 0 (zero), indicating that the learning has been completed, the program proceeds to a step 880 where the flag A is given 0 (zero). If NRmin is not equal to 0 (zero), the program proceeds to a step 990 where the routine ends and preparation is made for determination of the actual reduction ratio ir in the next routine. Even if imin is not renewed 6 (six) times in the step 860, the learning of the reduction ratio ir terminates upon counting 10 (ten) times.

In the flow along steps 910 to 980, substantially the same procedure is carried out in learning imax, and thus the description thereof is omitted. As described above, the learning is carried out once in the predetermined operating state.

It will now be appreciated that the ratio change allowable range of the continuously variable transmission can be fully used, thus providing a greater acceleration when the vehicle starts moving off from standstill or rapid acceleration is demanded, and a less fuel consumption during the stable operating state at high speeds.

I claim:

1. A method of controlling a reduction ratio in a continuously variable transmission of a vehicle, the vehicle including an engine drivingly connected to the continuously variable transmission and having a throttle which opens in degrees, and a control unit having a memory device, the method comprising the steps of:
storing a ratio change allowable range in the memory device having a maximum reduction ratio and a minimum reduction ratio;
preparing data containing various reduction ratios including reduction ratios falling outside of said ratio change allowable range;
determining a desired reduction ratio from said data and generating a desired reduction ratio indicative signal;
determining an actual reduction ratio in the continuously variable transmission and generating an actual reduction ratio indicative signal;
comparing said actual reduction ratio indicative signal with said ratio change allowable range stored in the memory device and generating a comparison result indicative signal when said actual reduction ratio indicative signal satisfies a predetermined relationship with one of said predetermined maximum reduction ratio and said predetermined minimum reduction ratio;
extending said ratio change allowable range to a new ratio change allowable range in response to said comparison result indicative signal and storing said new reduction ratio change allowable range in the memory device, said new ratio change allowable range having a maximum reduction ratio and a minimum reduction ratio;
comparing said desired reduction ratio indicative signal with said new ratio change allowable range;
determining an actually available desired reduction ratio falling in said new ratio change allowable range in response to the result of comparing said desired reduction ratio indicative signal with said new ratio change allowable range and generating an actually available desired reduction ratio indicative signal; and
carrying out the ratio change in the continuously variable transmission in response to said actual reduction ratio indicative signal and said actually available desired reduction ratio indicative signal.

2. A method as claimed in claim 1, wherein said extending step is carried out during a predetermined operating state where the vehicle is operating.

3. A method as claimed in claim 2, wherein said extending step includes determining said maximum reduction ratio of said new ratio change allowable range, and determining said minimum reduction ratio of said new ratio change allowable range.

4. A method as claimed in claim 3, wherein said step of determining said maximum reduction ratio is carried out when the opening degree of the throttle is greater than a predetermined value and the vehicle speed is less than a first predetermined vehicle speed value, while said step of determining said minimum reduction ratio is carried out when the opening degree of the throttle falls in a predetermined range and the vehicle speed is greater than a second predetermined vehicle speed value.

* * * * *